(12) United States Patent
Tilfors

(10) Patent No.: US 12,248,984 B2
(45) Date of Patent: Mar. 11, 2025

(54) CUSTOMIZABLE DATA TRANSACTION SYSTEMS

(71) Applicant: Nasdaq Technology AB, Stockholm (SE)

(72) Inventor: Jan Tilfors, Stockholm (SE)

(73) Assignee: Nasdaq Technology AB, Stockholm (SE)

( * ) Notice: Subject to any disclaimer, the term of this patent is extended or adjusted under 35 U.S.C. 154(b) by 433 days.

(21) Appl. No.: 16/784,355

(22) Filed: Feb. 7, 2020

(65) Prior Publication Data

US 2020/0258153 A1 Aug. 13, 2020

Related U.S. Application Data

(60) Provisional application No. 62/803,393, filed on Feb. 8, 2019.

(51) Int. Cl.
*G06Q 40/04* (2012.01)
*G06Q 10/0633* (2023.01)
*H04L 9/06* (2006.01)
*H04L 9/00* (2022.01)

(52) U.S. Cl.
CPC ......... *G06Q 40/04* (2013.01); *G06Q 10/0633* (2013.01); *H04L 9/0643* (2013.01); *H04L 9/50* (2022.05)

(58) Field of Classification Search
None
See application file for complete search history.

(56) References Cited

U.S. PATENT DOCUMENTS

| | | | | |
|---|---|---|---|---|
| 7,702,563 | B2 * | 4/2010 | Balson | G06Q 40/06 705/37 |
| 8,442,888 | B2 * | 5/2013 | Hansen | G06F 16/248 705/37 |
| 9,794,074 | B2 * | 10/2017 | Toll | G06F 21/54 |
| 10,540,716 | B2 * | 1/2020 | Cormack | G06Q 40/06 |
| 10,929,930 | B2 * | 2/2021 | Taylor | G06Q 40/04 |
| 2011/0087558 | A1 * | 4/2011 | Kalaboukis | G06Q 30/00 707/E17.108 |
| 2017/0213282 | A1 * | 7/2017 | Dziuk | G06Q 40/03 |
| 2017/0331774 | A1 * | 11/2017 | Peck-Walden | H04L 51/18 |
| 2018/0174255 | A1 * | 6/2018 | Hunn | G06Q 50/18 |
| 2018/0308134 | A1 | 10/2018 | Manning et al. | |
| 2019/0385215 | A1 * | 12/2019 | Ferenczi | G06Q 20/12 |
| 2020/0204510 | A1 * | 6/2020 | Pierce | G06Q 20/023 |

FOREIGN PATENT DOCUMENTS

| | | | |
|---|---|---|---|
| WO | 2007/028143 | 3/2007 | |
| WO | 2014/089673 | 6/2014 | |
| WO | 2016/011257 | 1/2016 | |
| WO | WO-2016011257 A1 * | 1/2016 | G06Q 30/06 |

OTHER PUBLICATIONS

International Search Report for Application No. PCT/SE2020/050125, five pages, May 28, 2020.

* cited by examiner

*Primary Examiner* — Christopher Bridges
(74) *Attorney, Agent, or Firm* — Nixon & Vanderhye P.C.

(57) ABSTRACT

A electronic market platform is provided that is configurable and able to provide functionality that supports a variety of different market models. The electronic market platform can be used to create different electronic exchange systems that allow participants to search, place orders, submit, RFQs, and refine initially agreed to matches.

18 Claims, 6 Drawing Sheets

CUSTOMIZABLE DATA TRANSACTION SYSTEMS

CROSS REFERENCE(S) TO RELATED APPLICATION(S)

This application claims priority to U.S. Provisional Application No. 62/803,393, filed Feb. 8, 2019, the entire contents of which are hereby incorporated by reference.

TECHNICAL OVERVIEW

The technology described herein relates to systems that handle or otherwise process data transaction requests. More particularly, the technology described herein relates to scalable or customizable frameworks that may be used to implement different types of computerized models and systems.

INTRODUCTION

Developing large, complex computer systems or applications can be a difficult and resource intensive task. Even with an appropriate investment of resources such computer systems may never become fully operational due to bugs, performance, and the like. Such development problems can also reoccur because even if one system is successfully developed, additional systems may need to be built to support new problems.

One way to try to address such development issues is by creating a framework, architecture, or the like that attempts to handle some of the lower level aspects of a given computer system or program. For example, development of video games often relies upon using general frameworks (e.g., DirectX, or openGL) to handle certain aspects of the video game that is being developed.

Electronic exchange computer systems are very complex and technical sophisticated computer systems that include different components that all operate together in order to provide functionality (e.g., an electronic marketplace) for participants. These systems allow for parties to exchange goods and services via the developed computer system. Examples of electronic exchange computer systems include the Nasdaq Stock Exchange and New York Stock Exchange. This systems provide an formalistic system (as opposed to an ad-hoc one that may rely on two people simply talking to one another) that helps to bring together various participants of a market (e.g., brokers, dealers, and others) for exchanging (e.g., buying/selling/etc.) various resources, objects, financial instruments, and the like. The development of such electronic exchanges has played an important role in society.

However, such electronic exchange computer systems can be highly specialized and adapted to handling specific types of data transaction requests (e.g., orders). For example, while such automated computer systems/electronic exchange computer systems may be designed for certain types of electronic data transaction requests, and their corresponding markets, they may not be equipped to easily handle other types of orders. Indeed, there are many types of transactions (and corresponding markets) that may be present in today's society that may not be handled in the automated or organized manner. The reason for such sort comings may be that developing the appropriate computer systems for such markets and their corresponding transactions can be challenging due to, for example, the requirements or parameters of a given market or transaction that takes place within that market. Accordingly, it will be appreciated that new and improved technology, techniques, systems, and/or processes are sought after in this area. For example, technology, techniques, systems, and/or processes for developing complex software and computer systems.

SUMMARY

In certain example embodiments, an electronic computing platform that is customizable and/or scalable is provided. In certain examples, the electronic computing platform includes functionality for providing markets as a service (MaaS). The platform may be deployed onto a computer system and includes an operational core (e.g., a trade workflow engine) that allows clients or participants to integrate product areas with each other, as well insert their own proprietary functionality (and/or third-party functionality). The architectural framework provided by the an electronic computing platform may allow for implementation of additional technology solutions that are based on different types emerging technologies including Blockchain, machine learning, and other types of technology. In certain examples, the electronic computing platform may also allow for modular and/or scalable implementations on onto different computer systems. In certain example embodiments, the platform includes an underlying trade or matching workflow engine that can be customized to meet the needs or requirements of specific implementations (e.g., markets). Using the platform discussed herein can provide technical advantages in terms of developing complex software applications that provide, for example, electronic exchange functionality.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which.

DETAILED DESCRIPTION

Figure 1A:
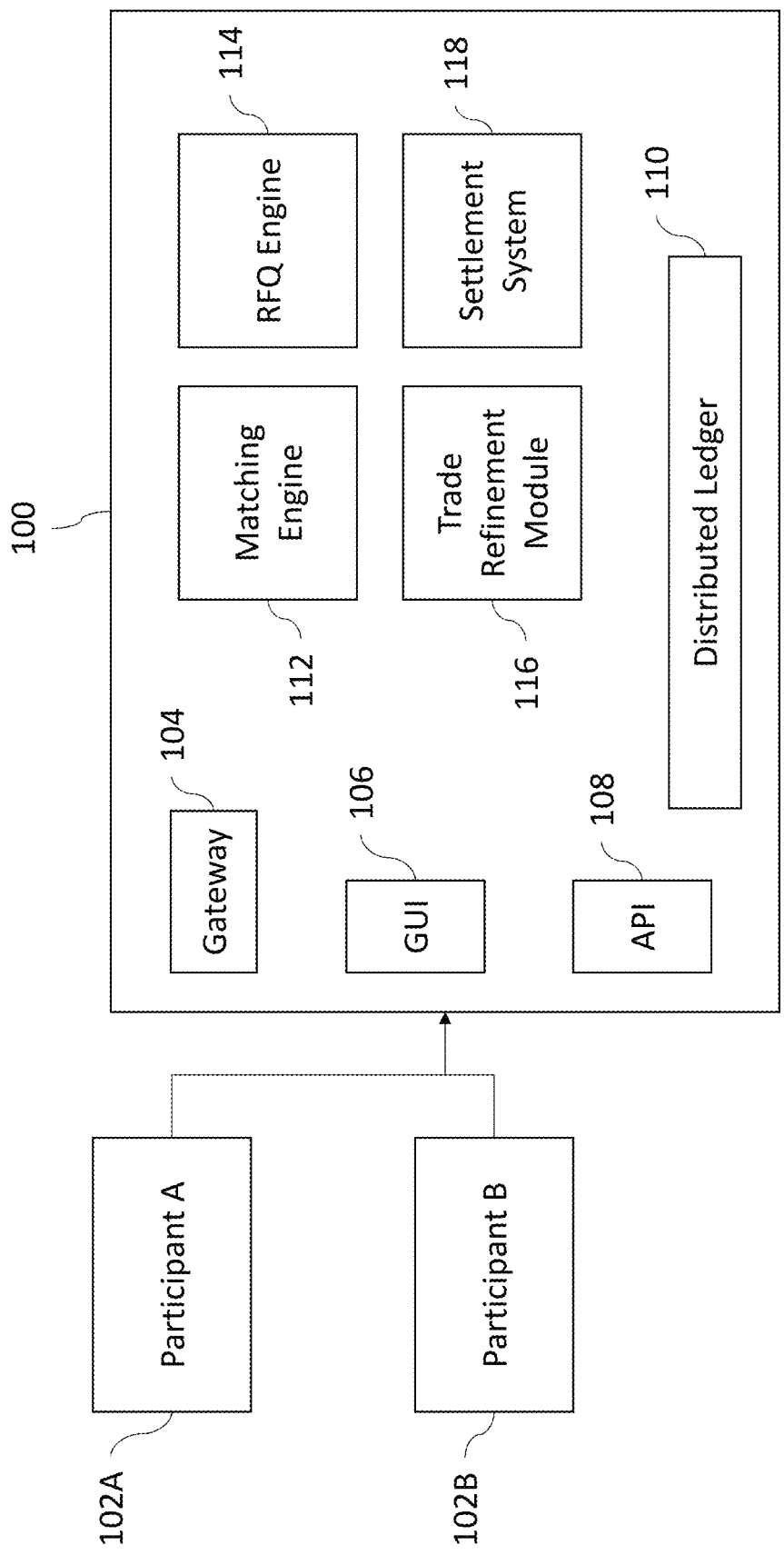
FIG. 1A is a block diagram of an example computer system that is implemented using the platform shown in FIG. 1B according to certain example embodiments.

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

An example electronic market platform computing system (also called electronic market platform herein) may involve modeling various aspects associated with markets, exchanges, and/or how goods and services are exchanged between parties. The modeling of such aspects may be based on generic or default models. An example electronic market platform may thus include one or more modules, engines, or models that are configured based on the specific needs of a given market or solution. One aspect of the example electronic market platform may include a trade workflow engine (also called a matching workflow engine herein). An example electronic market platform may also include one or more models, such as a market model, a trading model, and a risk management model. The electronic market platform may be used to create different types of electronic exchange computer systems that serve different types of participants, markets, and the like. For a given implementation (e.g., each instance of an electronic exchange computer system that is created using the platform), one or any combination of such models may be instantiated and defined to create the functionality for a given electronic exchange computer systems. Thus, for example, a market model for shipping may be different from a market model for airline seats or slots and each such model may be implemented using the same underlying electronic market platform to develop separate electronic exchange computer systems.

The electronic market platform may include or be configurable using different types of models. One type of model may be a market model that involves an overall description for a market and may include definitions for one or more of the following: 1) market participants—who is trading; 2) Instruments—what is traded; 3) trading model—how is trading conducted (this is expanded upon below); 4) a risk management model—how to ensure that a market participant will stand to a trade (this is expanded upon below); 5) Settlement—how is settlement handled; and/or 6) delivery—how to deliver the goods/service traded. Each instantiation of a given market model may thus be used for a different version or instance of an electronic exchange computer systems. An example electronic exchange computer system may be configured to use a market model based on all of the above, or may leave certain characteristics out depending on the particular needs of the market that is being served by the system.

A market model may also include a trading model. Trading models may be divided into three primary groups, although others are possible. First, a continuous trading model is that which is used in a classic equity market. This can be useful when there is a lot of market participants are trading for a fungible asset. A second type of trading model is an auction. Auctions are often used to pool liquidity into one event. Auctions can be used to open/close continuous markets or can be used to trade less liquid instruments. Auctions can be well suited for both fungible and unique assets. The third trading model is Request For Quote (RFQ). This model exists in different forms and is generally used for complex assets and often involves a follow up phase of a negotiation. In certain examples, an RFQ model can be thought of as digitization of a phone (or other analog) based market. Adopting one (or more) of these models in combination with the electronic market platform can then be used to create a new type of electronic exchange computer system that is tailed to a specific market or use case.

Risk management models may also be part of the overall market model that is used by electronic exchange computer systems that are developed from the electronic market platform. A risk management model may take into account the following for establishing risk management for the overall market: 1) trust—participants only trade with others that they trust; 2) credit checks—the market keeps track of different types of credit limits; 3) Central Counter Party (CCP) in which a third party guarantees the trade. CCP can include a whole clearinghouse which is a complex process.

Any, all, or none of the above models may be used by or be part of an example electronic platform that is used to implement or develop different types of electronic exchange computer systems. For example, one electronic exchange computer system may implement a pure RFQ trading model while another may forego RFQs completely. Thus, multiple different types of electronic exchange computer systems may be developed based on the same underlying electronic market platform that is discussed herein.

In certain instances, the technical implementation of such models as part of a corresponding electronic platform can facilitate the creation or development of new computer systems (or software applications as part of such systems) that serve new types of markets that have not traditionally been handled with automated electronic computer systems. Such techniques can thus solve technical problems associated with developing complex electronic trading and/or matching systems. Such system may also be used to address business problems, attract capital, and/or facilitate growth in, for example, previously underserved market areas.

In many places in this document, software modules (also referred to as engines or models herein) and actions performed by software modules are described. This is done for ease of description; it should be understood that, whenever it is described in this document that a software module performs any action, the action is in actuality performed by underlying hardware elements (such as a processor and a memory device) according to the instructions that comprise the software module. Further details regarding this are provided below in, among other places, the description of FIG. 4.

Figure 1B:
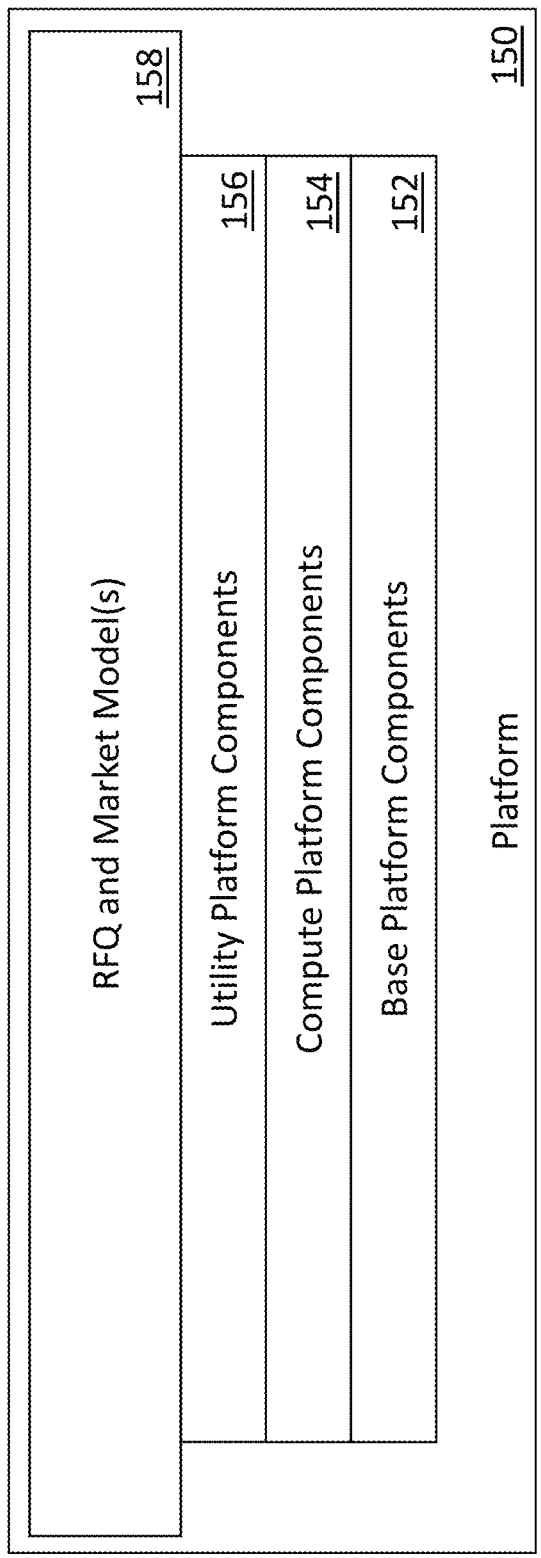
FIG. 1B is an architecture diagram for a platform 150 that is used to implement the computer system shown in FIG. 1A.

Description Of FIGS. 1A-1B

FIG. 1A shows a block diagram of an example computing system (system) 100 according to certain example embodiments. FIG. 1B is an architecture diagram for an electronic market platform (platform) 150 that is used to implement system 100.

Figure 4:
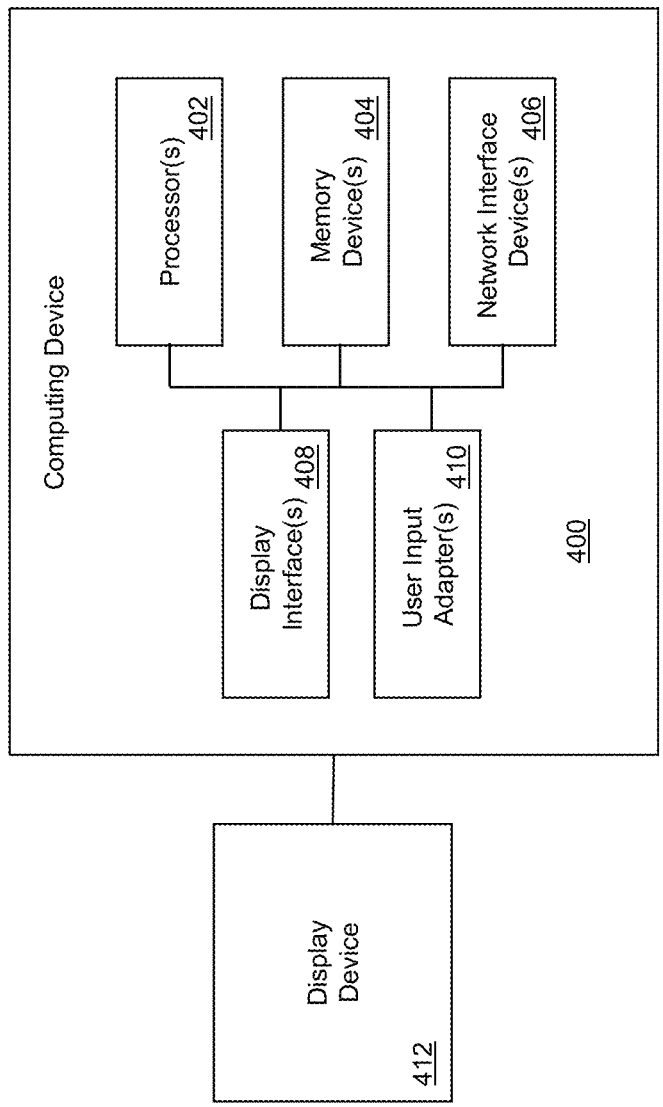
FIG. 4 shows an example computing device that may be used in some embodiments to implement features described herein.

Computer system 100 is implemented on one or more computing nodes or computing devices (e.g., one or more of computing device 400 from FIG. 4). In certain example embodiments, system 100 is comprised of multiple computing nodes that operate in concert to deliver the functionality described herein. In certain examples, system 100 may be implemented on a cloud-based computer system where computing nodes and other processing resources may be allocated on demand to meet the given processing of a particular process that is being executed thereon.

In certain examples, there may be multiple instances of system 100 where each instance supports or provides functionality for a different trading model or market. For example, one instance supports a market model for shipping, another a market model for steel, another a market model for loans, etc. . . . . . Each of these systems may operate differently (e.g., in terms of how the operation of the corresponding system). Each of these systems may be implemented using the same underlying platform (e.g., platform 150) that is then customized or configured to meets the needs of a particular environment or market.

Platform 150 includes a base platform 152 that may define a core data dictionary and core frameworks and APIs. Compute platform 154 implements the features of the base platform 152 and provides functionality for services that may be commonly used by an implementing system. Compute platform 154 may include authorization and authentication services, auditing and proof of process services, user administration, service discovery, messaging, and/or core scheduling and workflow services. In certain instances, the compute platform 154 may include a control plane and/or core data management functionality of implementing systems. Utility platform 156 may provide use case tailored platform instantiation(s) created from a composition of the base platform 152, compute platform 154, and/or additional services. Utility platform 156 may include, for example, REST/data services functionality, blockchain services, reporting services, an API gateway for $3^{rd}$ part integrations, etc. . . . . .

Marketplace platform 158 is built on top of, and uses, the functionality and services provided by the base, compute, and utility platforms. In certain example embodiments, the marketplace platform 158 provides components that enable the creation of two-sided markets that can bring together supplies and consumers, buyers and sellers, or the like in previously ad-hoc markets (e.g., those not being served by structured automated exchange computer systems). The marketplace platform 158 includes various components to facility the development of individual instances of computer system 100. For example, the marketplace platform 158 may be used to develop or implement an automated electronic exchange for healthcare. In certain example embodiments, marketplace platform 158 may include workflow models, a search engine, standard definitions (e.g., for orders/contracts), a trade workflow engine, a reference data manager model, report definitions, a market data model, a data governance metadata model, etc. . . . . . In certain example embodiments, marketplace platform 158 may include the trade workflow engine 248 that is discussed in connection with FIG. 2B. One or any of such elements of the marketplace platform 158 may be defined/customized for a given instance of the marketplace platform 158 that is developed (e.g., system 100).

Returning to FIG. 1A, in certain example embodiments, system 100 communicates with participants A and B and their corresponding computer systems 102A and 102B. Participants A and B can include traditional market participants and/or other services or entities such as insurance providers and other organizations or entities.

Computer systems 102A and 102B may interface or communicate with platform via gateway 104, GUI (graphical user interface) 106, API (application programming interface) 108, and/or distributed ledger 110. In general, such communication may occur by sending electronic data messages from computer systems 102A or 102B to the platform that then receives the message at one of the above entry points where the message is then passed to an appropriate internal component for processing and further action by system 100.

System 100 can include various components, modules, engines, or other functionality. In this example, system 100 includes the following components: a matching engine 112, RFQ (Request for quote) engine 114, trade refinement module 116, and settlement system 118. Each of these components may be implemented or supported by their own dedicated computing hardware or components may share hardware resources with other components.

Certain components may be optional. For example, the settlement system 118 may be optional if it is not needed to support a particular market model.

Activity that is performed on the system 100 may be stored in distributed ledger 110. In certain examples, all activity that is performed by system 100 is stored to ledger 110. In certain example embodiments, the contents of ledger 110 may be directly accessible by participants A and B.

Ledger 110 may, in certain example embodiments implement a blockchain. In certain example embodiments, ledger 110 may implement "smart" contracts.

A blockchain (e.g., the ledger) is a data structure that is provided or stored on a blockchain computer system (not shown) that may include a plurality of computer devices (e.g., as shown in FIG. 4) that communicate with each other over an electronic data communications network. Each node of the blockchain computer system may store a copy (or a portion) of the blockchain. Whenever it is described in this document that data (whether a transaction, or any other type of data) is stored on the blockchain, such storing may include: the initial reception of the transaction to the blockchain (or one of the nodes therein); the cryptographic verification of the transaction (e.g., its incorporation into a "block" of the blockchain); and/or a determination that the transaction is now computationally immutable (e.g., multiple blocks have been linked to the blockchain that incorporated the at-issue transaction). In certain examples, all nodes within the blockchain computer system are maintained by the provider of the system 100. In certain examples, one or more nodes may be maintained by participants or other third parties (e.g., regulators, etc. . . . ).

Ledger 110 (which may be a distributed ledger) may have the following benefits. One, interaction between market participants can be a peer-to-peer interaction rather than a interaction through a central marketplace. Two, a distributed ledger allows for several types of market participants accessing the platform (participants, provider of FX, provider of insurance, etc.). With a distributed ledger, all participants can have access to the same information at the same time with a decreased need for reconciliation. Three, settlement can be provided in a secure and reliable way using a distributed ledger. Settlement may also be accomplished via tokens of different kinds that may be developed for certain market segments.

The ledger 110 may keep all data that passes through the platform including, for example: 1) All trades from standardized firm orders, 2) All RFQ details, 3) All negotiation details, 4) All trade refinement details, 5) All final trades, 6) All delivery confirmations, 7) All settlements. In certain examples the data that is stored on the ledge may be encrypted. In certain examples, the orders may be visible to all participants (e.g., the whole market) while other data (e.g., RFQ data, negotiation data, trade data, etc. . . . ) may be made private (e.g., via encryption or the like).

It will be appreciated that nature of ledger may prevent (or at least make it computationally infeasible) from allowing deletion or changing of the data stored to the ledger. Further, the history for each trade may be always available.

The GUI 106 that is provided by the system 100 may allow for screen-based marketplace to be provided to participants. Different markets (e.g., each instance of the platform) may have different options depending on the type of market being served and/or the instrument series that is being traded. However, each instance (e.g., each instance of system 100) may still have access to the core infrastructure provided by the underlying platform that is used to implement each individual instance.

The GUI 106 may be provided via a web application, a desktop application, and/or an app for phone/tablet. In each case participants may be able to login and conduct manual trades (or setup automatic trades). Participants may search the central order book or database of relevant orders in a flexible manner so as to handle different asset classes requiring different directions. Each participant may have their own "home" page with access to a list of previous counterparties (e.g., per market segment and type of trade), ratings, exclusion lists, etc. . . . . Different views of the market that is served by the system may be provided, for example, a carrier view, a buyer view, and a marketplace operator view.

Matching engine 112 may operate to first identify preliminary matches between orders and trigger the negotiation process and/or to validate orders after the negotiation process. In certain example embodiments, two orders associated with a negotiation are matched (e.g., by the matching engine) when they have the same parameters. For example, the same price, current, volume unit, volume, and delivery period. Once a match is identified, one or more of the following processes may occur. One, an electronic term sheet is generated by the platform with the agreed terms of the trade. The term sheet is sent to the market participants and should be confirmed electronically within a given time frame. Two, data of the trade is stored within the platform (e.g. in ledger 110). Three, data of the trade is disseminated. This may be public, private, or semi-private (e.g., only to subscribers of a data feed).

Shipping Example

An example of how an electronic market platform (150) may be used to implement a specific type of electronic exchange computer system (100) will now be discussed in connection with the container shipping market. The container market has existed for hundreds of years. In recent times, many deals for shipping containers occurred via negotiations over the phone. Certain example embodiments relate to using the platform discussed herein for creating a system for carriers where the carriers can trade with clients and freight forwarders.

The shipping market includes various participants including sellers, which are basically large shipping companies that operate fleets of vessels. The buyers for the shipping market include direct clients (e.g., large companies) and freight forwarders (e.g., specialized shipping companies that handle shipping for smaller clients).

While both buyers and sellers could appreciate the benefits of an electronic exchange computer system (or generally the digitalization of the market in which they operate), they may view such a change from different perspectives. For example, sellers may see such a system as a new way of reaching out to and servicing their clients. In contrast, buyers may see such a system as new way of doing business were they can: 1) compare prices, 2) build up a bid side of the market, and/or 3) specify what they are prepared to pay for shipping services.

Thus, buyers generally favor a broader market in which multiple sellers are all taking part. Whereas sellers may prefer just to have their own inventory (e.g., vessel space) be present on the electronic exchange computer system.

Implementing an electronic exchange computer system for the shipping market may also presents one or more challenges, such challenges include the "no show" problem and "price formation."

No shows occur when the buyer of shipping simply does not show up—and they do not have to pay anything (because nothing is being shipped). The result of this problem is that carriers overbook their vessels. This can, in-turn, create follow up effects such as unhappy clients, industry overcapacity, and the like.

Price formation is a problem because the price is set by the carriers. This price is set, for example, for a few weeks out, but can be negotiated further. For example, the price may be lowered. This can result in buyers waiting for lower prices and comparing with different carrier. However, in certain examples for the electronic market platform, the price may go up and down. In other words, with firm trades, supply and demand will set the price.

Using the above information on how the market for shipping operates, the platform 150 may be used to implement a specific electronic exchange computer system (100) that is tailored to the specific needs of the shipping market. Such an implementation may be realized due to the functionality that is already present in the platform 150 being used to implement the electronic exchange computer system for the shipping market.

Figure 2A:
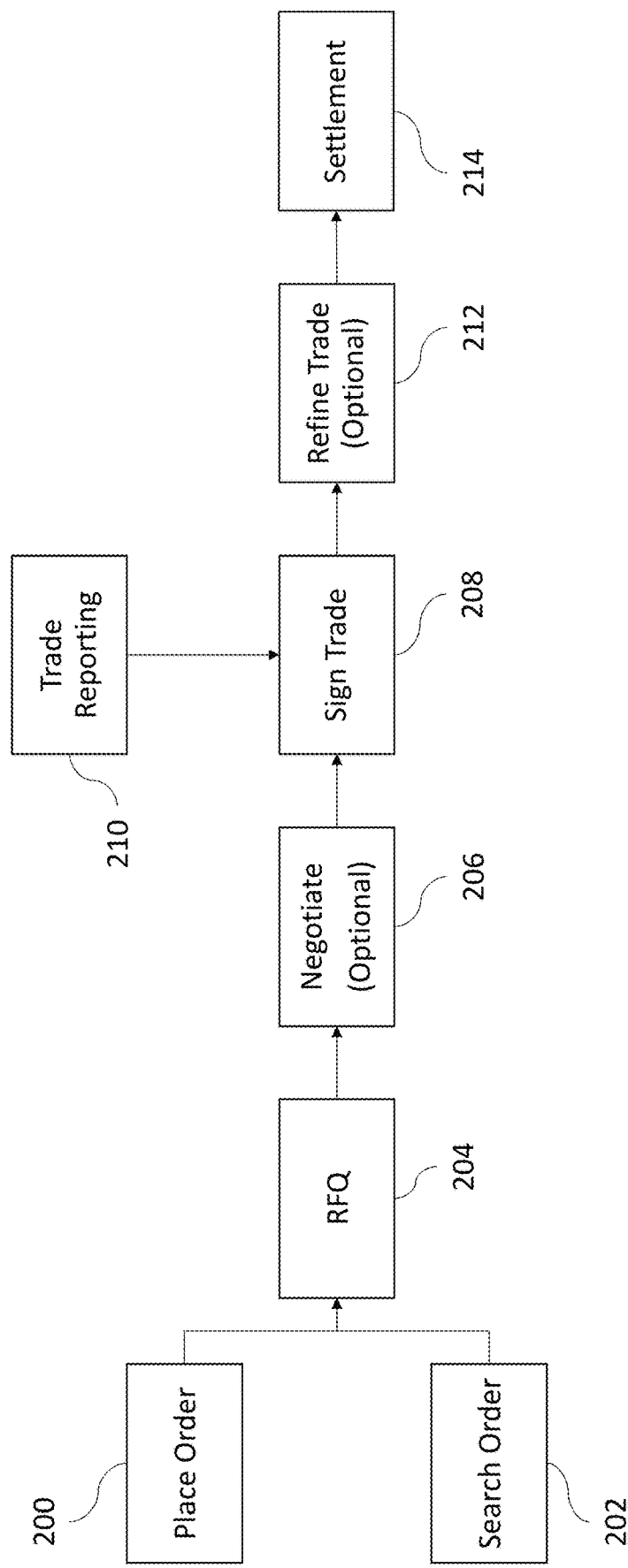
FIG. 2A shows an example workflow for a market model that may be implemented using the platform shown in FIG. 1B for the computer system shown in FIG. 1A according to certain example embodiments.

Description Of FIG. 2A

Figure 2B:
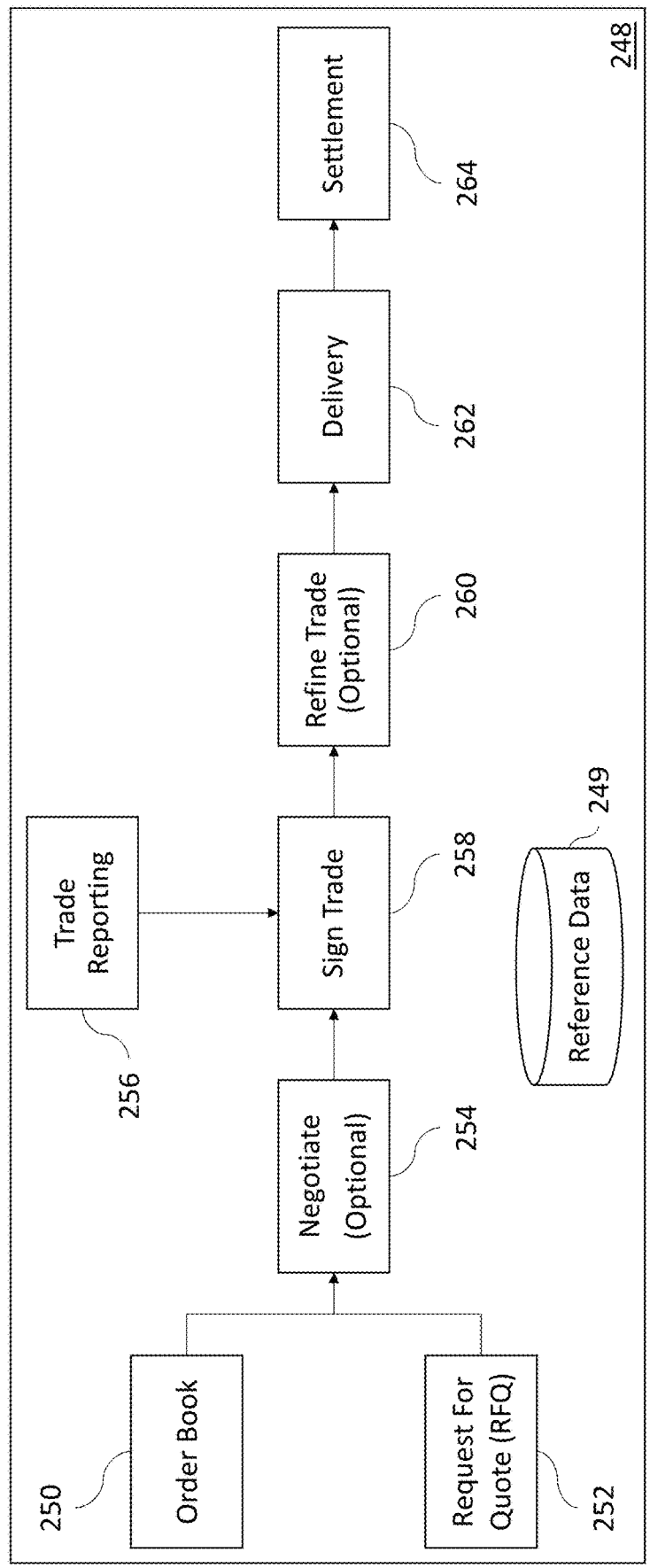
FIG. 2B is a block diagram of an example trade workflow engine according to certain example embodiments and that may be used in conjunction with FIG. 1A, 1B, or 2A.

FIG. 2A shows an example workflow for a market model (e.g., for shipping) that may be included with platform 150 and used to implement the example system 100 according to certain example embodiments. The discussion of the process below is provided in the context of the above noted shipping example and thus may be thought of as representing a specific implementation of the trade workflow engine 248 that is shown in FIG. 2B. It will be appreciated that other types of implementations may also be performed according to certain example embodiments.

At 200, participants (e.g., 102 and 104) can submit orders to system 100. These orders may be standardized and/or tailor made (e.g., completely definable by the submitting participant). Orders that are received may be stored into an order book or a central limit order book (CLOB). In certain examples, standardized orders and tailor made orders may share the same order book. In certain examples, the standardized orders and tailor made orders may be provided in different orders books. In a shipping example, orders may be submitted to system (100) by those who wish to buy (e.g., want to ship) and those who wish to sell (e.g., a carrier).

In certain examples, orders may have required or mandatory parameters. For example, mandatory parameters for shipping orders may include: 1) Asset (e.g., a container), 2) Route—this may be generic (e.g., Asia to Europe) or specific (e.g., Singapore to Rotterdam), 3) Time—this may be generic (Spring or April of 2019) or specific (Apr. 17, 2019), 4) Volume Unit (e.g., TIU), 5) Volume (e.g., a number of containers), 6) Limit Price, and/or 7) Firm order? (e.g. Y/N that indicates if this is a firm order or an indicative order).

A standard order in the shipping example may be for a specific route (e.g., Singapore—Rotterdam) for a specific time (August 2020). These may be standardized orders/contracts that may be defined by the participants and/or the system 100. In certain example embodiments, standard orders are stored into a standard order book. Standard orders may have firm orders that can automatically match (e.g., by skipping 206 and/or 212) and/or indicative orders that require further negotiation (e.g., per 206).

Alternatively, or in addition to standard orders, system 100 may also accept, at 200, tailor made orders. Tailor made orders can be standard orders with further specific parameters (e.g., the order is for a non-standard container size) or may be non-standard contracts (e.g., for an odd route, time frame, or other attributes that are defined by the participant).

In certain examples, tailor made orders will always be treated as indicative orders and thus trigger 206 and/or 212 during the finalization process or the order. In certain examples, the nature of the tailor made orders may be controlled by the originator of the order. For example, the originator can specify one or more predefined set parameters for the order. The tailor made orders that are offered by the platform can also include a set of flexible fields that the originator can define. This may include defining the nature of the parameter for the flexible field and the value(s) for that field.

In certain examples, the platform may allow implementers of an example system 100 to specify one or more fields that are required to be in the contract or other instrument that is being offered on the platform. For example, in the case of the shipping example, origin and destination may be required fields. Other types of fields, parameters, attributes, or values may also be required based on the specific needs of a particular market that is modeled by the electronic market platform. In any event, those orders that are received may be stored into an order book.

At 202 orders can also be searched with standard parameters (e.g., the above mentioned origin/destination) and/or flexible parameters. For example, a participant may search for orders that indicate there is space on a vessel sailing from Singapore to Rotterdam. Buyers or sellers may conduct searches for orders. In general, more specific searches may yield more specific responses from the system. For example, a search with the following parameters: 1) Asset: Container, 2) Route: Singapore—S Europe, 3) Time: April 2019, 4) Carrier: *, 5) Container type: TUI, 6) Limit price: *, 7) Currency: USD, and 8) Volume: 100 may return 100 responses matching the search query. In contrast a search with the following parameters may yield only 5 results: 1) Asset: Container, 2) Route: Singapore—Genoa, 3) Time: 12 Apr. 2019, 4) Carrier: Maersk, COSOM, 5) Container type: TUI, 6) Limit price: *, 7) Currency: USD, 8) Volume: 100.

At 204 an RFQ (Request for Quote) process may be started. This process may be handled by the RFQ engine 114 shown in FIG. 1A and/or the RFQ functionality that is provided by the trade workflow engine 248. The RFQ process may include, for example, sending an RFQ to a list of participants and participants may respond with a quote. In certain examples, orders that are already in the order book may match the RFQ and may be included in the response. Once these response are received, then the RFQ originator may decide who to trade/negotiate with (at 206).

In certain example embodiments, an RFQ process may start as a result of searching for an order (e.g., in 202). For example, a participant may search for orders and receive a list that match the given criteria. The participant may then send RFQs to all of the potential matches and/or select individual ones to send such RFQs.

In certain example embodiments, RFQs may be started from scratch (e.g., skipping 200/202). For example, a participant may specify data (similar to how the search order operation is performed) and send such a request to a selected list of counterparties. In certain examples, generated RFQs can be vague/broad or alternatively may be very specific in nature.

In certain examples, the RFQs may include a deadline for responses. In certain examples, the issuer of an RFQ may select who will receive the RFQ from a favorites list or the like. In certain examples, recipients of an RFQ may be able to see the other recipients of the RFQ. In certain examples, recipients will not be able to see who else has received the RFQ. In certain examples, the issuer of the RFQ may specify whether the receivers may see who else received the RFQ.

Once an RFQ is submitted, the platform 150 may provide functionality for tracking those participants who have responded. The issuer may view those response that have been received through GUI 106 or the like. The GUI may also be used to display (either in a separate section or not) those orders that are in the order book that have been determined to automatically match the RFQ. When a response is received for an RFQ, the issuer can proceed with one (or several) negotiations for the responses.

When participants receive the sent RFQs, the receipt is noted and the time for the deadline for responding is presented. In certain examples, issuer of the RFQ (who the issuer is) is displayed so that the receiver knows who they are dealing with. However, in certain examples, the issuer may be anonymous (e.g., no explicit issuer/participant information may be displayed or provided to the receiver).

Receivers may then choose to ignore or respond to the RFQ. When responding the receivers can choose how much responsive data to include in the response. The response may be vague (e.g., just enough start the negotiation process) or may be very specific. As noted above, and in certain example embodiments, the identity of the counterparty may always be available. This may function as one type of risk management (e.g., one that is based on trust an knowing who the counterparty is). In certain examples, the counterparty information may not be made available and/or additional or alternative risk management models may be employed. For example, a credit check or rating for the counter party may be displayed (without full identifying information).

The above described three process are 3 different ways in which a trade may be initiated (Send an order to be stored in the Order Book, search orders and suggest a trade for pending orders in the Order Book, and send a RFQ). The fourth way in which a trade may be initiated is by responding to an RFQ. Other options for initiating a trade are also possible and provided in the context of the trade workflow engine 248.

It will be appreciated that an RFQ is different from an order. When an RFQ is published, responding market participants may enter or update their orders in the Order Book in response to the RFQ and participate in the next step. A matching engine may also suggest orders (e.g., those pending in the order book) for the RFQ initiator.

At 206, a negotiation process may be executed with one or several potential counter parties and is started after a preliminary match is identified in the order book and/or a response is received from an RFQ. The negotiation may be over other parameters (e.g., those beyond the initial search parameters). For example, the negotiation may over price, time, and volume of the shipment. Both participants can suggest a solution to each parameter of the trade and the other participant can make counter offers or agree. In certain examples, this functionality may be handled by the trade refinement module 116.

Participants may agree on individual parameters and/or may agree on all (or multiple) parameters for the trade at the same time. In certain examples, each agreement may be recorded to the ledger 110.

In certain examples, a buyer or seller may negotiate with several counterparties at the same time for the same trade. However, each negotiation may be private and separate from the others.

Individual market instances of the platform may indicate those parameters that are required for finalizing a negotiation. In the shipping example this may include: 1) route; 2) volume unit; 3) volume; 4) price; 5) currency; 6) time line (with a certain level of specificity).

When the negotiation is finalized, all agreed parameters are memorialized to the ledger 110. This may include, for example, creating a term sheet that is electronically signed by both parties and subsequently stored to the ledger 110.

At 208, a trade is created when parties agree as a result of the negotiation at 206. The trade is memorized in a binding term sheet and may be electronically signed. The term sheet may specify the minimum matching parameters for (in the case of the shipping example) a route, time, price, and volume. Other parameters may also be included.

At 210, external trades can be reported to system 100. Specifically, the platform 150 provides functionality that allows externally agreed to trades to be reported to an implementing system (100). Specifically, participants may have other means of agreeing on a trade but may still wish to use the functionality provided by system 100 for documentation, trade refinement, additional services (e.g., split trades, insurance, etc. . . . ), settlement, and the like. A reported trade can either be reported by both parties (and matched on the system 100) or reported by one party and signed off by the counterparty.

A reported trade may be generated based on parameters provided by an implementing system 100. For example, the platform 150 may provide the following parameters for defining a trade that is being reported to an implementing system: 1) Asset, 2) Currency, 3) Price, 4) Volume, and 5) Volume unit. Other parameters may also be supplied and/or required (e.g., based on the specific needs of a given market model). In certain example embodiments, once a trade report is confirmed, an electronic term sheet or final contract for the completed trade may be generated and signed electronically by both parties. In certain example embodiments, once a trade report has been confirmed, all other functions of the platform can be used (trade refining, settlement, etc.).

Later, at 212, the trade that was subject of the binding sheet may be refined and other parameters may be added. This may be handled by the trade refinement module 116 as shown in FIG. 1A. This process may include adding further details/parameters to the trade or adjustments of the earlier parameters (e.g., price, etc. . . . ). When the trade parameters are agreed upon the final contract is signed and stored to the ledger 110.

Agreeing on parameters may include simple refinements and/or more complex negotiations. A simple refinement is a way for participants to agree on a trade parameter. Specifically, one of the participants may suggest the to the counterparty a trade refinement—for example the exact dock to be used for the departing vessel. The counterparty may then acknowledge the trade parameter and it may be added into the final trade electronic contract. Again, each of the modifications and finalizations may be stored to the ledger 110.

Some trade parameters in a trade can be more complex (e.g., than the above example) upon which to agree. Assume, for example, a shipping contract has been initially agreed to for a Singapore to Rotterdam route for a specific week. Now that initially agreement needs to further refined. For example, the seller participant may provide the buyer participant with three different choices of vessels leaving the specific week on the specific route. The negotiation is in this case started by the seller who gives the buyer the following three options: 1) Wednesday: Arrival within 25 days—price adjustment 0; 2) Monday: Arrival within 21 days—Price adjustment +15; and 3) Friday: Arrival within 32 days—Price adjustment −5. As shown, the negotiation refinement options may have a price adjustment included whereby the seller may stick to the original deal (option 1) in one case, but may ask for a higher price in another case (option 2), and a rebate in a third case (option 3). In certain examples, the system may require that one of the options match the original preliminary price. This variation in price may be based on, for example, the seller's view of the market and the capacity of the specific vessel for that specific route. The seller can accept one of the negotiation refinement options or reply with a counteroffer. After the negotiation is concluded, the parameter is added to the final contract.

Platform 150 may provide functionality to keep track of pending trades that still need refinement/finalization and automatically notify participants of trades that need refinement/finalization. GUI 106 may be used by participants to search for pending trades and show those trades that still need refinement/finalization. In certain examples, the refinement process occurs over the system 100 as defined by the underlying platform 150. However, other means outside of the platform may also be used (e.g., phone). The trade reporting 210 may be used to report the result of the refinement/finalization.

At 214, delivery of the asset is confirmed outside of the marketplace. For example, by using RFID tracking. Settlement may then be managed on the functionality provided by the platform once both parties confirm delivery. Settlement may be handled by the settlement module 118 that is shown in FIG. 1A.

In certain examples, settlement is optional and can be managed outside of an implementing system 100. In certain examples, settlement may be an parameter in a trade. In certain examples, the settlement process is initiated when both parties have confirmed that delivery have taken place. Depending on the type of market that the platform 150 is supporting, the timing may be different. Timing and standards for settlement may vary by asset/resource/service that is the subject of the market being modeled with the platform 150.

The platform 150 may support one or more of the following additional features for implementation on a given system: 1) buyback and resell options; 2) counterparty insurance; 3) refining trade negotiations; 4) split trade; 5) add trade; 6) trading strategy; 7) account receivables; 8) ratings; 9) user experience; 10) credit checks; and/or 11) FX. Each of these are discussed in turn below.

As noted above, certain examples may include the ability for buy back and resell options. Such options may be included into an order and/or RFQ. A buy back is where the trade (or part of the trade) can be reversed between the parties. Once a buy back is initiated then the price and/or volume for the reverse trade can be negotiated.

An example of a buy back in the shipping example would be as follows. Participant D and Participant S agree on a trade for shipping 500 containers 6 months ahead. The price is 54 per container. However, one month before delivery D asks S for a reversal trade of 100. This may trigger a negotiation phase where the price for the reversal trade may be agreed to at 49. This trade is closed.

For a resell, the participants may agree to include a resell option for the buyer, seller (less likely in the shipping context), or both. The resell option may include a restriction on who the contract can be resold to. Participant B and Participant S agree on a trade for 500 containers 6 months ahead. The price is 54 per container. The trade has an option for B to resell within the same client tier or better. 2 month ahead of delivery B sees an opportunity to resell 200. After a negotiation B resells 200 to Participant B2 at the price of 60. In certain examples, this will cause the platform to set the following trades: 1) B and S will handle and settle a trade of 400 at 54; 2) B2 and S will handle another trade of 200 at 54; and 3) B2 will pay B a fee of 200*6 (60-54).

In certain examples, other types of trade refinements may be included or supported by platform 150.

For example a split trade may be offered. A split trade can be a useful feature for both participants of a trade. For example, assume a trade where two parties have agreed to a shipping contract from Singapore to southern Europe in the month of April for 100 containers. A few months before delivery, both parties have a need to further specify trade parameters and both parties can introduce a negotiation for splitting the trade. The split can be done in several dimensions. The split may be split in different days in April. The split may be for different destinations to Southern Europe. The split may include moving part of the trade to another month (e.g. May). A combination of these three may also be impended. In certain examples, when a trade is split, any minimum volume requirements (e.g., for the shipper) may still be enforced. Split trades may be memorized to the ledger 110.

Other functionality that may be added or supported by platform 150 may be for add trades. Such trades may be offered only to the counter party of an existing trade. Add Trade functionality may be used to add different dimensions to the trade. For example, add volume to the trade (note that reducing volume would be reverse trade), adding a destination (e.g., adding an additional leg to a shipment or the like).

In certain examples, counterparty insurance may be included and/or supported by the platform 150. Counterparty insurance may be beneficial because and order will often be delivered will into the future—something that introduces risk to both parties to a trade. For example, if a counter party goes "bust" (or is taken out of the market for some other reason), then the trade may fail because it was a bilateral trade. This can introduce problems for the market participant on the other side of the trade (e.g., a hedge is lost and/or revenue is lost). Participants can seek to account for such situations by choosing their counterparties carefully (e.g., only those they trust)—but there will always be a risk that the matched trade may fail.

Accordingly, the platform may allow for insurance companies to offer insurance to each side of a trade. Such offers may be made on a per trade basis (e.g., as a parameter to the trade). Thus, the trade of insurance will not be with the counterparty of the asset, but rather the with an insurance company as a separate trade.

When trade has been agreed and one of the participants in a trade wants insurance for the counterparty in the trade, the trade may be presented to insurance companies. In certain examples, insurance companies may view such requests via the GUI 106 and/or may be notified via other means (e.g., an alert such as an email). In certain examples, participants may have preconfigured parameters with a list of insurance companies with which they will operate with. The insurance companies may respond with a quote and the market participant decides which insurance company to use for the trade. As noted above, this will form an additional trade that is between the participant and the insurance company.

Different types of insurance options may be supported by platform 150. A first type may be for covering a hedge option whereby the insurance company will cover the financial loss of the hedge in a failed trade situation. A second type may be for securing delivery. This may be for both buyers and sellers (mostly buyers however). The insurance company will take the role of the failing counterparty of the trade. This involves 100% takeover of the trade and actually delivering the goods according to the contract (e.g., specific performance). It will be appreciated that this may involve more risk and undertaking on the part of the insurance company. A third type may be for secure payment for sellers. Specifically, sellers may purchase insurance to receive payments.

Platform 150 may be configured to provide support for access to insurance organizations. The access may be for all trades to allow the insurance organizations to rate trades and give accurate quotes for insurance coverage for the various contracts and trades.

In certain examples, the platform may support FX trades. As discussed above, the currency underlying an order is one of the parameters the counterparties may agree to for a trade. Thus, for example, if the agreed currency is USD, one (or both) of the counterparties can also optionally decide to do an immediate hedge of the FX transaction. However, an FX forward trade (as with the insurance trade) may be executed in another trade with another counterparty independent of the trade in the original contract.

In certain examples, there may be market makers quoting FX rates on the platform. If there is a trade agreed in steel, which is denominated in USD, and the buyer has an additional FX parameter set to EUR, it indicates that the buyer wants to do a FX trade where EUR is sold and USD is bought on the calculated settlement date (this option then assumes that the counterparties have agreed on a date for the delivery and a settlement date can be calculated with appropriate daily swap points). The suggested FX order is sent as an RFQ to FX market makers on the platform who may then respond with quotes. The buyer in the trade selects one of the RFQ offers and a separate FX trade is matched. Thus, multiple trades may be generated from an original order.

In certain examples, platform 150 may support strategy trading as a way to manage multiple routes. This may be used to account for changes (using the shipping example) when a route changes from sea to road or vice versa.

In certain example embodiments, platform 150 may support account receivables trading. For example, as an alternative to sellers insurance (secure payment), a seller can also sell a payment from a counterparty in the future. The data for such a trade may be already available on the platform including: 1) The payment and all history attached to the payment, 2) The counterparty and rating of the counterparty, 3) They payment itself (if settlement is done within the platform). The owner of the payment in the future (e.g., the seller of the asset) can, for different reasons, want to sell the payment. For example, the participant may not trust the counterparty.

The platform 150 may include functionality for handling the trading of the accounts receivable through an auction process (e.g. instead of an RFQ process). Thus, for example, the seller of the payment may initiate an auction by announcing an auction time and information about the payment. Interested bidders may subscribe to the information, evaluate the risk and make their bids. The auction may then take place at the given time. Upon completion of the auction, settlement and transfer of the payment ownership may be memorized to ledger 110.

In certain example embodiments, only one buyer for the account receivable may be allowed. In other embodiments, the payment may be split between multiple buyers. In certain examples, the account receivable may be sold at one price or different portions may be sold at different prices. In certain examples, the auction process may also include a negotiation phase.

In certain example embodiments, the platform 150 may support ratings. Different types of ratings may be supported. A first type may be for order and trade ratings—e.g., how often do orders from a given participant generate a trade (e.g., Successful Orders, Successful trade suggestions, Successful RFQ, Successful RFQ responses).

A second type may be trade refinement rating that represents how easy or flexible a participant is during the trade refinement process. This rating may represent the negotiation track record of the participant. This rating may also include multiple different types of sub-ratings. A third type may be a quality of delivery rating. This rating may also include different measurements for different types of assets. A fourth type of rating may be for an insurance rating for insurance companies and their services. A fifth type may be a payment rating that rates counterparties for their payments.

Participants may also have different types of rating with different types of transparency for those respective ratings. There may be private ratings for individuals (e.g., person A stores their own ratings). There may company ratings. There may be ratings that are shared within a group. For example, a group of companies and individuals who have agreed to rating and sharing with each other. Several groups may exist and one rating may be part of different groups. Public ratings may be available to all participants that are using a given system 100.

Platform 150 may also provide functionality for advance risk management including credit limits and bilateral credit checks. For credit limits, each participant may have a set of credit limits (e.g., max single order value, max total open order value, etc. . . . ). For a multi-dealer environment the limits may be set by the system operator. For a single-dealer environment (discussed below) the limits may be set by the carrier (in the shipping example). In certain example embodiments, each new order, RFP issue, and/or RFP response may be validated against relevant credit limits.

Bilateral credit checks may be applicable in a multi-dealer market place. Each participant may define a total credit limit for each counterparty. The platform may then support keeping track of the total credit between counterparties to make sure a limit is not exceeded. In certain examples, a participant may chose to ignore orders and RFQ from participants with not enough credit.

The example discussed in connection with FIG. 2A relates to a multi-dealer platform (e.g., in which multiple shipping carriers participate). However, the above workflow may also be applicable to a single dealer platform with one or more of the following modifications.

First, there may be only one seller in all original deals. In such an instance, a resell from the carrier will never occur (e.g., there is only one seller on the implementing system)—they may arrange shipping by other carrier but they will solve that outside the system and stand the trade with the counterparty. A resell from a buyer may be possible. Either directly with the carrier (who is the counterparty of a trade) or can also be sold to other buyer. The conclusion of the term sheet and final contract may be easier as the carrier may set the standard for these.

Description Of FIG. 2B

FIG. 2B is a block diagram of an example trade workflow engine 248 according to certain example embodiments and that may be used in conjunction with FIGS. 1A, 1B, and/or 2A.

The trade workflow engine 248 includes one or more of the following modules: Order Book module 250, Request For Quote module 252, Negotiate module 254, Sign-Trade module 258, Trade Reporting module 256, Refine Trade module 260, Delivery module 262, Settlement module 264. In certain example embodiments, the modules of the trade workflow engine 248 may implement the functionality described in connection with the workflow that is shown in FIG. 2A.

Trade workflow engine 248 may operate based on defined reference data 249. Such data may be stored in a non-transitory storage medium of the implementing system (e.g., a database or the like). This may include, for example, the details of the resource that is being traded, definitions of market participants, definitions for entitlements, and account setup aspects.

In certain example embodiments, the reference data may include two different types of "contracts" that can be specified. These contracts may be represented as different data structures within the reference data 249—with each data structure being able to be used by an implementing system. Accordingly, each reference to a "contract" herein corresponds to the data structure that is used to implement the terms of that contract in the implementing system. In any event, a first type of contract is a standard contract that works with a standard order book. Different example marketplaces (e.g., different instances of system 100) may define one or more different "standard" contracts. Each of a plurality of different standard contracts may be paired with its own order book (e.g., a data structure that is used to hold the electronic form of such contracts). Orders (also called data transaction requests in that they are requests, such as buy/sell, for a given contract) for such contracts may be placed and can be matched via the order book. In certain examples, multiple standard contracts may share the same order book. The fields of each standard contract (e.g., those that are to be filled in by participants for orders for such a contract) can vary depending on the type of resource and the market for that resource that is being served by the developed system. In certain example embodiments, the orders that are submitted for a given standard contract may be ranked within the order book by using, for example price+time. In certain examples, other rankings may be used (e.g., price+volume or price, volume, time and the like). While the orders may be ranked the underlying functionality for matching of such orders may operate such that there is no obligation to match against the "best" ranked order. In certain example embodiments, participants may selected those orders to match/trade against (e.g. hit & lift trading).

The other type of contract that may be defined within a framework that is used by the trade workflow engine 248 is a participant-defined contract. In certain instances (e.g., certain types of market or trades) it may be difficult to specify predefined, standard contracts. This may because, for example, there are simply too many parameters that could be included into a contract. Such a situation could thus lead to a very large amount of standard contracts (that each address different ones of the many possible parameters). The downside to this approach is that it can lead to a system that is not so efficient to manage. Accordingly, in certain example embodiments, market participants may specify what they want to trade. Contracts may then be created based on those parameters. This is the approach for participant-defined contracts.

An order fora participant-defined contract may include one or any number of the following fields. First, mandatory parameters (e.g., a buy/sell indicator. Second, standard parameters, which may include a set of standard parameters assigned for a given resource (e.g., an asset). For standard parameters, users/participants may decide if a parameter is used and what the value should be for that parameter. Third, flexible parameters are those where a participant defines fields with a description and a value for a given order.

In certain example embodiments, participant-defined contracts (PDC) may be created by participants that take a standard contract and apply additional parameters to the standard contract. The contract (e.g., the order for the contract) then becomes a participant-defined contract.

As discussed elsewhere herein, from the participant order, an order book is created. The order book may be visible for other participants to view to thereby allow orders within the order book to be searched (e.g., 202). Other market participants can then place orders in the order book that is created in connection with the submission of the participant-defined contract. In other words, a standard contract may be associated with a first order book and a participant may apply additional parameters to that standard contract to create a participant defined contract. Upon submission of a corresponding order (or confirmation of the creation of a new participant defined contract, a corresponding order book may be created to hold orders that are then submitted in-line with the newly created participant defined contract.

Reference data may also include parameters that define the nature of the market participants, how the market operates, and the entitlements within the created market.

Reference data may include configuration data that specifies the nature of the participants involved in the market—i.e., who is trading. Markets may use different models (e.g., as discussed herein) that define who can trade, what they can trade, which roles they have in the market, and the like. The reference data that is included and used by the trade workflow engine 248 may use one or more rules and each instantiation of the trade workflow engine 248 may defined specification how such rules are used within that instance.

Reference data 249 may thus include (and support) a member model and a direct participant model. A member model operates where end clients do not trade directly with each other by using system 100, but rather they go a member (or broker) to initiate a trade, submit an order, etc. . . . . A direct participant model operates where end clients (e.g. the participant) interacts directly with the system 100. These definitions can be further refined as different actors (or users) may operate within a given participant. The actors may include users (e.g., real people) and/or computer implemented algorithms. Marketplace operators may be defined as a market participant with several actors within the participant.

Entitlements may also be defined within reference data 249. Specifically, the various participants for a given system may be stored in a hierarchy within the reference data 249. Similarly, standard contracts and participant-defined contracts may also be organized into hierarchies. For each contract a corresponding order book may be created. Order books can be organized in a hierarchy.

With such hierarchies, entitlements may be defined according to different levels in a hierarchy: contracts that a participant can access, contracts that an actor can access, order books that a participant can access, order books that an actor can access. Thus, for example, system may be created using the trade workflow engine 248 that defines only one participant on the "sell" side of the market. The define system and the market it is serving would thus be a single dealer market.

Reference data 249 may also include different accounts for participants. For example, in the case of a member-model, participants may have different accounts for different end clients. In the case of a direct-participant market model, the individual participants may have different accounts for different purposes.

The order book module 250 includes functionality for creating orders and searching for orders that are stored in an order book. In the case of standard contracts, orders are placed in the standard contract order book. Orders that are created (e.g., submitted) and then stored in a corresponding order book may be firm or indicative. In certain example embodiments, firm orders are those that may match immediately against a contra-sided order (e.g., handled by sign-trade module 258). In certain example embodiments, indicative orders are those that may require further negotiation and may thus be passed to the negotiate module 254. Accordingly, firm orders may bypass the functionality associated with the negotiate module.

In certain example embodiments, orders for PDCs may be created in one of two ways. First, a standard contract may be used as a starting point that has additional fields added thereto. Second, a PDC (e.g., the requirements to place an order for a given PDC) may be created using an order template. Order templates may be defined by the system that is using the trade workflow engine 248. In other words, each system (100) that is created and using the trade workflow engine 248 may create a number of different order templates. The templates may differ depending on the resource (e.g., asset) and/or type of market that the created system (100) is serving.

An order template can be divided into two parts: 1) Definition of the item; and 2) Definition of the terms for the trade. Fields in an order template can be of three types. First, mandatory fields (e.g., those that need to specified). For example, the Buy/Sell indicator, where the participants define if the order is a buy or sell order. Second, optional fields that do not need to be specified. For example, a delivery date for the indicated resource. In this specific example, if the delivery where specified it would then indicate a deadline for when the delivery takes place. Third, participant-defined fields that are fields a participant may define.

When an order is specified using a template it is sent into the system (100). The system validates and controls each order. In certain examples, each system may have its own unique validation process. When the order is approved it is inserted into the system (e.g., its order book) and/or an order book is created for that order. In certain examples, a unique identifier is assigned to the PDC. Once the order book is created, other market participants can view the order book and insert their own orders into the order book. Orders in the order book can be changed or deleted by the participant who inserted the order.

The order book module 250 may also include functionality for searching for orders. This functionality allows for searching of PDCs and/or standard contracts that are implemented by the system in question. Search options may include using the unique identifier that is assigned to a PDC. The results of such a search may be one or several contracts. Several contracts can be the result if the wildcard (?, *) function is used as part of the search query.

In certain examples, an order template may be used to allow a participant to fill in the fields of interest and see what PDC and orders that exist that match the fields (including wildcards) that are specified in the search.

In certain examples a free text search option may also be used to search (e.g., freely) across order books that match the indicated search criteria. This search may operate across several different PDC identifiers and across different order templates.

Request For Quote module 252 includes functionality for handling request for quotes that may be implemented by the system that has implanted the trade workflow engine 248. RFQs may be implemented by the platform 150 as data structures. Thus, when an RFQ is received and acted upon by an implementing system, a data structure that is maintained by the system may be used to implement the RFQ thereon. The RFQ module may include functionality for handling RFQ issuance, reception of RFQs, responses to RFQs, and viewing of existing RFQs.

The request for quote module 252 includes functionality for handling the issuance of RFQs in multiple different ways. First, RFQs may be created from scratch. For example, a participant may specify similar data as an already placed order and send the RFQ to a selective list of counterparties. The RFQ can be quite vague in nature (e.g., it contains only a high-level specification) or it may be very specific in nature.

In certain examples, an RFQ can be in the form of a standardized contract or in a participant-defined contract. An RFQ can be very specific (exact order conditions) or quite vague (few parameters). Each system may configure and define the rules for how RFQs can be outlined or otherwise defined. RFQs can be firm (e.g., the functionality of negotiation module 254 is skipped) or indicative (e.g., negotiation is required). RFQ functions may be flexible in regards to who is behind the RFQ (or response). In other words, the RFQ may display or make available the identity of the counterparty or the RFQ can be anonymous. In certain example, embodiments, the issuer of the RFQ may decide who should receive the RFQ (e.g., from a "my favorites" list for the participant). The RFQ may include a deadline for responding to the RFQ.

When a new RFQ is received by the system, the RFQ module may note a recipient and a deadline of the RFQ. The RFQ may then be delivered to (or a notification sent) to other participants regarding the RFQ. In certain examples, a given receiver of an RFQ may not be able to see who else has received the RFQ. The recipient of the RFQ may then choose to respond or ignore the notification.

The RFQ module 252 handles the responses that are received for a given RFQ. Such responses can be firm or indicative (depending on the conditions in the original RFQ and on the participant responder's choice). In certain example, embodiments the original RFQ may include definitions for required response parameters. The responder also can also decide how much data to include in the response (e.g., vague to specific). This may be thought of as entering into a negotiation phase (e.g., the that is handled by the negotiate module 254.

The RFQ module 252 may also handle providing those responses that have been received to the original issuer. Thus, the RFQ issuer can, at any time, view responses that have been received thus far. The RFQ module 252 may also provide functionality for filtering and/or sorting RFQ responses. In the response to an RFQ there are (optional) responses from the order book that fully or partially matches the RFQ.

In certain example embodiments, the RFQ module 252 may also start a matching process if the RFQ process involves a firm RFQ and firm responses (and such an RFQ and responses indicate a match). Matching may be automated (e.g., no additional input required) or may be partially automated such that additional input from the participant may be required (e.g., the RFQ issuer may decide which of multiple possible matches to match with—hit & lift matching). In certain example embodiments, the issuer of the RFQ can, at any time, introduce one or several negotiations with the responders.

Accordingly, the RFQ module 252 may handle reception of an RFQ issuance from an initiator, providing the RFQ to potential responders, receiving the responses, allowing the initiator to view and act upon the responses and, at least, starting a matching process.

In certain example embodiments, an order or an RFQ may include a defined buy back or resell option. In the case of a buy back, if a buy back-option is agreed upon in a trade, one or both parties of the trade have the right to do a reverse trade on the whole or part of the agreed volume. This is convenient when, for example, the buyers in a trade do not know exactly how much they need of the goods; this option gives them the right to resell whatever volume that is not needed. The conditions for the buy-back may be agreed upon in the original trade or may be negotiated. A resell means that one or both of the parties have the right to resell the trade before the delivery is completed. The parties can agree to include a resell option for the buyer, the seller, or both (e.g., the buyer resell option is most likely used). The resell option may include a restriction on who the contract can be resold to. This limitation can be defined by using, for example, a predefined list, a specific tier, that confirmation from the counterparty is needed, etc.

Negotiate module 254 handles the negotiation phase of matching opposing parties to a contract. This may include handling electronic communications regarding a trade on all parameters of that trade. Both participants to the trade can suggest a solution for each trade parameter (e.g., distance, destination, time, etc. . . . ), and the other party may communicate a counteroffer or agree. The time for a negotiation can be short (minutes) or very long (months). Thus, the negotiate module 254 may maintained the state of a negotiation between two parties over a long period of time. This may include saving history data of the negotiation within the system. Such history may then be provided to participants in the future. The negotiate module 254 may include functionality for handling documentation of outside communication. For example, if the participants have contact outside the system (e.g., via phone, mail, fax, etc.), then such communication may be documented within the system. The negotiate module 254 may be provide standard templates for such documentation.

A negotiation starts after a contact has been established (e.g., two orders matched) in an order book or through an RFQ. Negotiations can also be used for other purposes. The negotiation is a general tool that can be applied in different stages of the trade workflow engine 248 (e.g., by the RFQ module, the trade refinement module, during trade execution, etc.). A negotiation can be for a standardized contract or a participant-defined contract. A participant may negotiate with several counterparts at the same time and for the same trade; however the negotiate module 254 handles each negotiation as private and separate from other negotiations.

Depending on when in the trade process, the outcome of the negotiation is different. One possible outcome is that there is no agreement and the negotiation stops (e.g., the trade is terminated). Another possible outcome is to further escalate the issue within the system. Another possible outcome is that both parties agree (e.g., the parties "sign" the agreement). An agreement can be for one, any, or all of the following: A single parameter, A trade agreement, A final trade agreement, Trade refinement negotiations, Trade execution negotiation. In certain example embodiments, the negotiation module may be programmed such that the negotiation process results in a no-trade scenario or a signed trade (e.g., that is passed to the sign-trade module 258).

Sign-Trade module 258 handles the official electronic signing of the trade. Signing a trade is when the parties agree to do a trade with each other. Depending on the asset and the market, the minimum parameters that have been agreed upon for signing a trade can be different. In certain example embodiments, once the electronic signing is complete no additional changes may be allowed (e.g., no changes or backing out of the trade) in other markets for different systems changes to a signed trade may be allowed (e.g., which may be handled by the refine trade module 260). For example, an exact shipment date may be left blank.

Trade Reporting module 256 is a module for handling externally sourced data. For example, parties may have other means than the system for agreeing on a trade. However, the parties may still make use of the system (100) for documentation purposes, trade refinement, settlement, and other functionality. Thus the trade reporting module 256 provides an reception point for parties to report trades to a given system. The trade reporting module 256 may support trade reports. A trade report can be in a standardized contract or in a participant-defined contract. If it is in a PDC, a trade-report template is used (e.g., the same format as the order template). A trade report may be registered by one of the parties and signed by the other. Once the trade report has been registered, the counterparty is notified. In certain example embodiments, if the counterparty does not agree to the conditions of the trade report, he or she can decline it or move into negotiations. The submitted trade report may be checked and approved by the system.

The refine trade module 260 provides functionality that allows participants of to a trade can further refine the details of the trade. This may include: clarification of terms of the trade, negotiation of the final parameters of the trade, renegotiates the whole trade, cancel the trade, splits the trade, add trades, etc. . . . . A trade refinement may be initiated by one of the parties of the trade and/or by the system itself. For example, the system (100) may initiate a trade via a smart contract where the trade itself has further parameters and/or timeline that needs to be agreed upon. The system may keep track of the information through a smart-contract solution provided on a blockchain or the like.

A split trade is when a trade between two parties is split into several trades. It will be appreciated that a split trade both from a technical (e.g., a separate record within the system is created) and legal (e.g., a new contract) point of view may create a new trade.

There can be several reasons to split a trade: Delivery delays for part of the volume. The original trade was a frame agreement—split trade is used to further split the original frame agreement into real trades. Parts of the trade is to be traded (buy-back or resell).

The refine trade module 260 may also support adding volume to a trade as part of a trade refinement. The refine trade module 260 may also support adding a whole new trade (e.g., a new trade is created from a legal and technical perspective). In certain examples, add trade can be suggested to the counterpart based on an existing trade. Add trade may starts with an old trade as a base, and then the counterparts create a new trade based on the old one. An "Add" trade may always require some negotiations.

In general, the refine trade module 260 may include two types of trade refinement functionality. The first is a simple refinement for a formality that requires no negotiation. The second is for a negotiation where the parties negotiate and agree on trade refinement. This may involve price changes to the trade. Each given system that implements the trade workflow engine 248 (e.g., for different assets and/or markets) may have different rules as to what does and does not apply.

A trade will behave like a smart contract when it comes to trade refinement. In this case, it means that the contract itself will highlight to the parties (and the system operator) when trade items need to be refined. For example, the delivery date is not exactly defined one month before a preliminary delivery date, then the parties may be notified to take action. Each type of trade (e.g., that is based on an order template) has its own schedule of smart contract items.

The delivery module 262 provides for different delivery functionality depending on the nature of the system (and the market it is serving). Each system may develop its own specific routines using the functionality that is provided by the delivery module 262. In certain instances, delivery routines can even be different for different assets within the same system.

Different types of general delivery modes may be supported: First, the system keeps an electronic register of ownership. In this case, delivery means that the system changes the ownership in the register. Second, an external party keeps track of ownership or manages a physical delivery. In this case, delivery means that the marketplace creates a delivery instruction for the external party that is keeping track of ownership. Third, delivery is managed bilaterally by the parties. In this case, the marketplace keeps track of when the delivery should take place and the parties manage the delivery. Both parties confirm to the marketplace when delivery is completed.

The delivery module 262 may support different types of bilateral delivery. First, instant delivery that takes place immediately (or within a few days). Second, delivery over time. In certain examples, this may be a service or a physical delivery that takes a long time to manage (several weeks). In the case of delivery over time, events that occurs in connection with the delivery may be logged (e.g., in a log file/database/etc.). In certain examples, these logs (and the corresponding events) and may also result in further negotiations by the parties.

The delivery module 262 also provides functionality for delivery sign off. In other words, once delivery has taken place, there is a formal trace closure procedure where both parties sign that the trade has been delivered and completed. The exact nature of this process may be configured depending on the asset and the market that is being served by the created system (100).

Settlement module 264 provides functions for handling settlement. Such settlement can take place inside or outside of the system that is serving the given market. If the system keeps track of ownership through a register that is maintained within the system, then delivery versus payment (DvP) may be used and settlement can takes place within the marketplace.

If an external party manages the delivery settlement, then the system or the external party may still be used to handle settlement. Either settlement is managed by the external party (the system may create settlement instructions based on trades) or it is managed within the system. The external party and the system may be integrated to allow for DvP.

If bilateral delivery is used, then the settlement module 264 may optionally be used to provide settlement within the system. However, in general, DvP is not possible when bilateral delivery is used. If settlement is managed outside the system the system may generate settlement instructions based on trades. If settlement takes place within the system, then both parties need to confirm delivery when completed to trigger settlement.

In certain example embodiments, partial settlement may be supported by the settlement module 264. For example, the system may define (or the parties in a trade may agree) to do partial settlement. For example, 25% of the total settlement should be paid upfront (e.g., at time of the trade). The settlement module 264 may flexibly provide settlement schedules that are flexible on the context of the market being served, the asset, and/or per trade.

The trade workflow engine 248 may also support other types of functionality (or the following functionality may be supported via additional modules that are outside of the trade workflow engine 248). In certain examples, the trade workflow engine 248 may include functionality for handling central limit checks. This may include, for example, fat finger checks that are basic volume and price checks to avoid simple mistakes. Overall risk limits (e.g., based on the traded value, etc. . . . ) may also be used. In certain example embodiments, position limits may also be used for systems that store the current positions of participants. In certain examples, system and participant limit checks may be used. The system may or may not define certain limit checks that are used for all participants. The participants may also define limits that apply to their actions/messages. Limit checks may be applied to orders, RFQs, and RFQ responses. Note that limit checks may be skipped during the negotiation phase.

In certain example embodiments, trade workflow engine 248 may include functionality for bilateral limit checks. Specifically, a participant can define limits for how much they are allowed to trade with other counterparties. In certain examples, if the limit is set to zero, then no trade can be made with that specific counterpart. Each market participant may define a total credit limit for each counterpart. The limit may be in a single currency (or cross-currency rates may be used if multiple currencies are specified). The trade workflow engine 248 may include functionality for keeping track of the total value of all open trades between counterparts. If a limit is reached, then the associated trade be flagged and required additional authorization. In certain examples, A participant can chose to ignore orders and RFQs from participants who don't have enough credit.

The trade workflow engine 248 may also support providing market data. The following are possible functions that may be employed—with each system that is implementing the trade workflow engine 248 having their own policy. One option may be to have Real-time orders & trades from the order book. Such information may include or exclude participant identity. Real time trades (and trade reports) from signed trades. This may include or exclude the participant identity. The previously mentioned data can be delayed and/or provide in daily/monthly/weekly statistics.

Different types of fees for using the system may also be employed. One or more of the following may be supported in conjunction with a given instantiation of the trade workflow engine 248. Fee per trade: 1) Value per trade (sometimes with min and max value); 2) Different fees for maker/takers; 3) Fees for complex trade refinement. In certain examples, a trade modification fee (e.g., if trade is re-opened prior to settlement) may be employed. In certain examples, a trade cancellation fee may be used.

Access to a given system (100) that is implementing trade workflow engine 248 may be accomplished via REST API.

Implementing trade workflow engine 248 on a system may allow for additional systems as third-party services. For example, a freight service that is added to items that are bought in the market. When using third-party services, the orders in the third-party system can be traded separately or traded as a complex order. A complex order means that the two orders are traded as one bundled order where there is no risk that only one of the two trades are executed.

As discussed herein, all events on the system may be stored to the ledger. This may allow for all data to be stored, ensures no changes to the data, that authentication is managed by a cryptographic solutions, that a participant/actor can, at any time, access all their private data. The ledger can be centralized or distributed. In certain examples, order search and order management actions do not need to be stored in the ledger Produce and sell data analytics.

Figure 3:
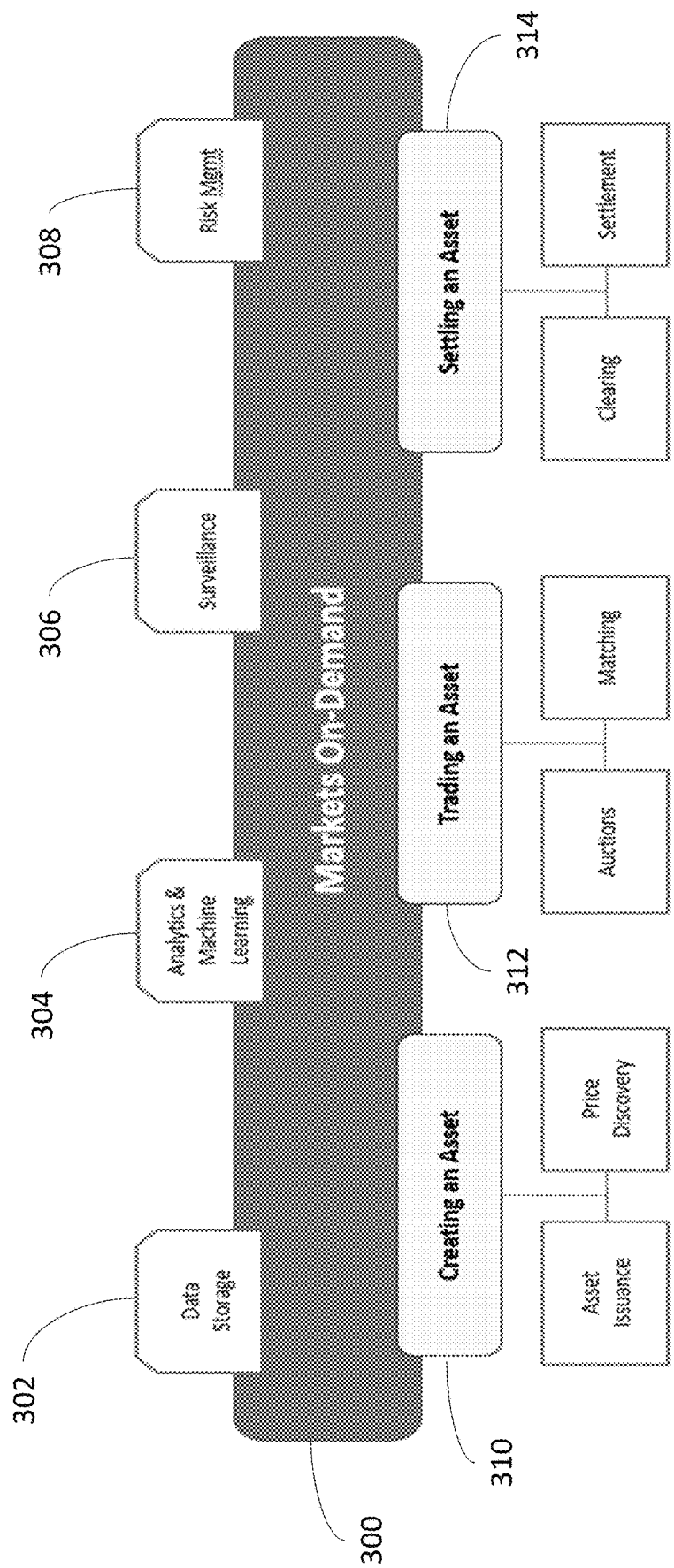
FIG. 3 is an example block diagram showing various components of a computer system that implemented from an example electronic platform.

Description Of FIG. 3

FIG. 3 is an example block diagram showing various components of an example electronic platform that may be used to support different types of systems, corresponding markets for those systems and trading associated with such markets/systems.

System 300 (which may be the same as, or a modification of, system 100) is based on a computing platform that allows for the creation of various types of markets for trading assets and other items of value. Different instances of the platform may be spun up (e.g., in a cloud computing environment and/or on different virtual machines) based on the needs of a target market—hence "markets on-demand." System 300 includes various components for realizing on-demand markets. The components include data storage 302, which may include internal databases and a distributed ledger (e.g., ledger 110). Data storage may include storage for a central limit Order Book as well as storage for real-time Off-Order Book transactions. Analytics & machine learning component 304 may provide analytics and machine learning functionality for the market that is being implemented. This may include presenting information based on the data contained within system 300 (e.g., Orders, RFQs, Trades). Analytics examples include may include: 1) the future price of each asset and service traded is found in all trade data, 2) Company-traded volumes with future delivery may indicate future evaluation of companies using the platform (e.g., how much steel producer A is selling or how much steel car manufacture B is buying), 3) Insurance evaluation and pricing of every market participants by leading insurance companies, and/or 4) Completed FX deals for delivery versus payment at Contract maturity.

Surveillance 306 may be provide in-depth reporting on the operation of a given market that has been created (e.g., a full look at the order book and all pending orders for a market). Risk management component is a component that provides risk management functionality has detailed herein.

System 300 may include 3 main components for functionality related to creating an asset 310 (allowing participants to discover orders, create orders. etc. . . . ), trading that asset 312 (e.g., either in terms of auctions or matching), and settling trades in that asset 314 (including, for example, clearing and settlement).

The platform upon which system 300 is based may be flexible in how trading for a given asset is conducted but generally each asset order may specify: 1) whether it is a buy or a sell, 2) which market that asset belongs to (e.g., which order book), and 3) a collection of order parameters (examples of orders parameters for a shipping example are discussed herein). In certain examples, order parameters may be predefined for given markets (e.g., each order within that market will always have that particular parameter). Each system that implements the platform may be configured to allow for participants to define that own parameters for their own orders. The following table illustrates the various parameters that be me used depending on the nature of market model being implemented via the platform.

TABLE 1

| Transportation & Logistics | Steel | Syndicated Loans |
|---|---|---|
| Buy/Sell | Buy/Sell | Buy/Sell |
| Price | Price | Price |
| Currency | Currency | Currency |
| Volume | Volume | Volume |
| Volume unit (number of standard containers) | Volume unit (tons) | Buy/Sell |
| | Delivery date period | Price |
| | Quality measurement 1 | Currency |
| Delivery date period | Quality measurement 2 | Volume |
| Departure region 1 (for example Asia) | Quality measurement 3 | Volume unit (1,000's) |
| Departure port (for example Singapore north port) | When (departure): Year | Delivery date period |
| | Month | When (maturity): Year |
| | Date | Month |
| Departure doc | Time | Date |
| Arrival region 1 (for example Europe) | Where Region | Time Where |
| Arrival region 2 (for example Genoa) | Country | Region Country |
| Arrival doc | City | City |
| When (departure): Year | Address Storage | Address Storage |
| Month | Counterpart: | Counterpart: |
| Date | Tier | Tier |
| Time | Rating | Rating |
| | | List of |

TABLE 1-continued

| Transportation & Logistics | Steel | Syndicated Loans |
|---|---|---|
| Priority load (last in first out) | List of counterparts | counterparts Position options |
| Counterpart: | Position options | Call Option |
| Tier | Buyback | Put Options |
| Rating | Resell buy leg | |
| List of counterparts | Resell sell leg | |
| Position options (see below) | Insurance | |
| Buyback | | |
| Resell buy | | |
| Resell sell | | |

Trading for an asset may be conducted with a hybrid model of an order book displaying open orders for a particular Contract, RFQs which are an indication of intent to buy or sell a specified quantity of a Contract, and verbal or email negotiations. As discussed herein, a participant can search orders in an Order Book using a flexible criteria. In certain examples, a number of predefined standardized instrument series parameters (e.g., months for delivery) may be used. Participants may also define their own parameters (tailor made instruments). Trade matching for two Orders can be accomplished when the parties agree on key criteria of the match (e.g., asset, price, volume, date). Subsidiary attributes to the trade (e.g., delivery instructions) can be refined later.

Trading for an asset also may include the trade match refinement process whereby two parties in a trade agree on trade attributes in addition to the standardized criteria.

In general, when a system is implemented (e.g., to support one or more markets) by using the platform discussed herein it may support one or more of the following objectives: 1) provide automation to a previously manual and complex market; 2) create transparency in the market; 3) Create a two sided market with bids and offers; 4) Create predictability of prices in the future available for transactions, and 5) Be able to close and open position in the market multiple times.

In other words, the technology provided by the platform discussed herein may allow for such benefits to be realized.

In certain example embodiments, each instrument that is offered on a given system can be traded as an outright instrument for purchase or sale, or as part of a combination order (e.g., strategy), namely the simultaneous purchase or sale of two (and perhaps up to four) instruments (e.g., respective legs). Participants may create custom combinations orders (e.g., "Tailor-Made Combination" or "TMC") for contracts which are not already defined in an Order Book. User-defined TMCs may be initiated intraday, but some may not be immediately available for trading. Participants can place working combination orders that, if matched, simultaneously trade the referenced single leg Instruments according to the specified strategy without execution risk. Once implemented, a TMC Order Book is visible to the entire market for the remainder of its defined lifetime from one to ten days (or less, if a single leg expires).

Description Of FIG. 4

FIG. 4 is a block diagram of an example computing device 400 (which may also be referred to, for example, as a "computing device," "computer system," or "computing system") according to some embodiments. In some embodiments, the computing device 400 includes one or more of the following: one or more processors 402; one or more memory devices 404; one or more network interface devices 406; one or more display interfaces 408; and one or more user input adapters 410. Additionally, in some embodiments, the computing device 400 is connected to or includes a display device 412. As will explained below, these elements (e.g., the processors 402, memory devices 404, network interface devices 406, display interfaces 408, user input adapters 410, display device 412) are hardware devices (for example, electronic circuits or combinations of circuits) that are configured to perform various different functions for the computing device 400.

In some embodiments, each or any of the processors 402 is or includes, for example, a single- or multi-core processor, a microprocessor (e.g., which may be referred to as a central processing unit, CPU, or a hardware processor), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 402 uses an instruction set architecture such as x86 or Advanced RISC Machine (ARM).

In some embodiments, each or any of the memory devices 404 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 402). Memory devices 404 are examples of non-volatile computer-readable storage media.

In some embodiments, each or any of the network interface devices 406 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 408 is or includes one or more circuits that receive data from the processors 402, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 412, which displays the image data. Alternatively or additionally, in some embodiments, each or any of the display interfaces 408 is or includes, for example, a video card, video adapter, or graphics processing unit (GPU).

In some embodiments, each or any of the user input adapters 410 is or includes one or more circuits that receive and process user input data from one or more user input devices (not shown in FIG. 4) that are included in, attached to, or otherwise in communication with the computing device 400, and that output data based on the received input data to the processors 402. Alternatively or additionally, in some embodiments each or any of the user input adapters 410 is or includes, for example, a PS/2 interface, a USB interface, a touchscreen controller, or the like; and/or the user input adapters 410 facilitates input from user input devices (not shown in FIG. 4) such as, for example, a keyboard, mouse, trackpad, touchscreen, etc. . . . .

In some embodiments, the display device 412 may be a Liquid Crystal Display (LCD) display, Light Emitting Diode (LED) display, or other type of display device. In embodiments where the display device 412 is a component of the computing device 400 (e.g., the computing device and the display device are included in a unified housing), the display device 412 may be a touchscreen display or non-touchscreen display. In embodiments where the display device 412 is connected to the computing device 400 (e.g., is external to the computing device 400 and communicates with the computing device 400 via a wire and/or via wireless communication technology), the display device 412 is, for example, an external monitor, projector, television, display screen, etc. . . . .

In various embodiments, the computing device 400 includes one, or two, or three, four, or more of each or any of the above-mentioned elements (e.g., the processors 402, memory devices 404, network interface devices 406, display interfaces 408, and user input adapters 410). Alternatively or additionally, in some embodiments, the computing device 400 includes one or more of: a processing system that includes the processors 402; a memory or storage system that includes the memory devices 404; and a network interface system that includes the network interface devices 406.

The computing device 400 may be arranged, in various embodiments, in many different ways. As just one example, the computing device 400 may be arranged such that the processors 402 include: a multi (or single)-core processor; a first network interface device (which implements, for example, WiFi, Bluetooth, NFC, etc. . . . ); a second network interface device that implements one or more cellular communication technologies (e.g., 3G, 4G LTE, CDMA, etc. . . . ); memory or storage devices (e.g., RAM, flash memory, or a hard disk). The processor, the first network interface device, the second network interface device, and the memory devices may be integrated as part of the same SOC (e.g., one integrated circuit chip). As another example, the computing device 400 may be arranged such that: the processors 402 include two, three, four, five, or more multi-core processors; the network interface devices 406 include a first network interface device that implements Ethernet and a second network interface device that implements WiFi and/or Bluetooth; and the memory devices 404 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of the system 100, gateway 104, GUI 106, API 108, Matching engine 112, trade refinement module 116, RFQ engine 114, settlement system 118, and distributed ledger 110, each of which will be referred to individually for clarity as a "component" for the remainder of this paragraph, are implemented using an example of the computing device 400 of FIG. 4. In such embodiments, the following applies for each component: (a) the elements of the 400 computing device 400 shown in FIG. 4 (i.e., the one or more processors 402, one or more memory devices 404, one or more network interface devices 406, one or more display interfaces 408, and one or more user input adapters 410), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 404 (e.g., in various embodiments, in a volatile memory device such as a RAM or an instruction register and/or in a non-volatile memory device such as a flash memory or hard disk) and all actions described herein as performed by the software modules are performed by the processors 402 in conjunction with, as appropriate, the other elements in and/or connected to the computing device 400 (i.e., the network interface devices 406, display interfaces 408, user input adapters 410, and/or display device 412); (c) alternatively or additionally, to the extent it is described herein that the component processes and/or otherwise handles data, in some embodiments, such data is stored in the memory devices 404 (e.g., in some embodiments, in a volatile memory device such as a RAM and/or in a non-volatile memory device such as a flash memory or hard disk) and/or is processed/handled by the processors 402 in conjunction, as appropriate, the other elements in and/or connected to the computing device 400 (i.e., the network interface devices 406, display interfaces 408, user input adapters 410, and/or display device 512); (d) alternatively or additionally, in some embodiments, the memory devices 402 store instructions that, when executed by the processors 402, cause the processors 402 to perform, in conjunction with, as appropriate, the other elements in and/or connected to the computing device 400 (i.e., the memory devices 404, network interface devices 406, display interfaces 408, user input adapters 410, and/or display device 512), each or any combination of actions described herein as performed by the component and/or by any software modules described herein as included within the component.

The hardware configurations shown in FIG. 4 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 4, (e) via other hardware arrangements, architectures, and configurations, and/or via combinations of the technology described in (a) through (e).

Technical Advantages of Described Subject Matter

By using the different models discussed herein in combination with the generic trade workflow engine (e.g., the platform 150) the creation and development of new computer systems (or software applications as part of such systems) can be facilitated in order to serve new types of markets that have not traditionally been handled with automated electronic computer systems. The techniques discussed herein can thus solve, or at least partly address, the technical problems associated with developing complex electronic trading and/or matching systems. The platform may be constructed with a generic industry-agnostic market model (e.g., the generic trade workflow engine) that may then be further customized, configured, or the like based on specific application needs.

In certain example embodiments, trading an contract may become more standardized over time. All parties will gain from such a trend and efficiency improvements would be a benefit for all parties.

In certain example embodiments, trading can be provided more easily between participants who do not know one another. The electronic access and insurance functionality provided by the platform helps to enable this. Moreover, over time prices will be more harmonized globally and the market will become more efficient.

In certain example embodiments, increased transparency may be realized in combination with the possibility for both sides of the marketing providing bids/offers. As a result prices may become more stable.

Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Additional Applications of Described Subject Matter

Although process steps, algorithms or the like, including without limitation with reference to FIGS. 1-3, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A computer system comprising:
   a reference database that is stored on a non-transitory storage medium, the reference database including:
      1) a plurality of standard data structures that each include at least one predefined field to be specified by a participant, and
      2) a plurality of participant defined data structures that are based on one of the plurality of standard data structures, each of the plurality of participant defined data structures including a respective participant defined field, wherein each respective participant defined field is not included in the one of the plurality of standard data structures;
   a matching workflow engine comprising instructions stored to the non-transitory storage medium and configurable based on which one of the plurality of standard data structures or the plurality of participant defined data structures are defined;
   a processing system that includes at least one hardware processor, the processing system configured to:
      receive a first data transaction request that is based on a first participant data structure of the plurality of participant defined data structures;
      receive a second first data transaction request that is based on a second participant data structure of the plurality of participant defined data structures, wherein the first participant data structure and the second participant data structure are based on the same one of the plurality of standard data structures, but include different participant defined fields;
      based on reception of the first data transaction request, (a) instantiate a first instance of the matching workflow engine and configure the first instance based on at least one parameter included in the first participant data structure, (b) create a first order book data structure that is based on the first participant data structure, (c) and add the first data transaction request to the first order book data structure;
      based on reception of the second data transaction request, (a) instantiate a second instance of the matching workflow engine and configure the second instance based on at least parameter included in the second participant data structure, (b) create a second order book data structure that is based on the second participant data structure, (c) and add the second data transaction request to the second order book data structure;
      subsequent to creation of the first or second order book data structure, receive other data transaction requests that are based on the first or second participant data structure and insert the other data transaction requests into the first or second order book data structure;
      perform a matching process, in connection with the first and second instance, to determine at least one match for data transaction requests that are included within the first or second order book data structures;
      receive a first request for quote (RFQ) data transaction request that is based on one of the plurality of standard data structures or one of the plurality of participant defined data structures;
      receive a plurality of responsive RFQ data transaction requests that are provided in response to the request for quote data transaction request; and
      match at least one of the plurality of responsive RFQ data transaction requests to the first RFQ data transaction request.

2. The computer system of claim 1, wherein the first RFQ data transaction request is indicative, wherein the matching workflow engine is further configured to start a negotiation process upon determination that the at least one of the plurality of responsive RFQ data transaction requests is determined to match properties of the first RFQ data transaction request.

3. The computer system of claim 2, wherein the negotiation process includes communication of additional details concerning the match between participants associated with the at least one of the plurality of responsive RFQ data transaction requests and the first RFQ data transaction request.

4. The computer system of claim 1, wherein the first RFQ data transaction request is firm, wherein the matching workflow engine is further configured to start a matching process upon determination that the at least one of the plurality of responsive RFQ data transaction requests is determined to match properties of the first RFQ data transaction request.

5. The computer system of claim 4, wherein the matching process is started without additional communication from corresponding participants of the at least one of the plurality of responsive RFQ data transaction requests and the first RFQ data transaction request.

6. The computer system of claim 1, further comprising a blockchain that is stored to non-transitory storage of at least one computing node.

7. The computer system of claim 6, wherein each event that is handled by the matching workflow engine is stored into a blockchain transaction that is recorded to the blockchain.

8. The computer system of claim 1, wherein at least one participant defined data structure that includes at least one participant defined field is based on one of the plurality of standard data structures for which a participant has added the at least one participant defined field.

9. The computer system of claim 1, wherein the matching workflow engine is configured to operate differently depending on what configuration options are specified in the reference database.

10. A method of generating a computer system that handles matching between different types of data transaction requests, the method comprising:
  storing a reference database to a non-transitory storage medium, the reference database including 1) a plurality of standard data structures that each include at least one predefined field to be specified by a participant, and 2) a plurality of participant defined data structures that are based on one of the plurality of standard data structures and each include a respective participant defined field for the respective at least one participant defined data structure, wherein each respective participant defined field is not included in the one of the plurality of standard data structures;
  storing a matching workflow engine to the non-transitory storage medium;
  receiving, at the computer system, a first data transaction request that is based on a first participant data structure of the plurality of participant defined data structures;
  receiving a second first data transaction request that is based on a second participant data structure of the plurality of participant defined data structures, wherein the first participant data structure and the second participant data structure are based on the same one of the plurality of standard data structures, but include different participant defined fields;
  based on reception of the first data transaction request, (a) instantiating a first instance of the matching workflow engine and configure the first instance based on at least one parameter included in the first participant data structure, (b) creating a first order book data structure that is based on the first participant data structure, and (c) adding the first data transaction request to the first order book data structure;
    based on reception of the second data transaction request, (a) instantiating a second instance of the matching workflow engine and configure the second instance based on at least one parameter included in the second participant data structure, (b) creating a second order book data structure that is based on the second participant data structure, and (c) adding the second data transaction request to the second order book data structure;
  subsequent to creation of the first or second order book data structure, receiving other data transaction requests that are based on the first or second participant data structure and insert the other data transaction requests to the first or second order book data structure;
  performing a matching process, in connection with the first and second instance, to determine at least one match for data transaction requests that are included within the first or second order book data structures;
  receiving a first request for quote (RFQ) data transaction request that is based on one of the plurality of standard data structures or one of the plurality of participant defined data structures;
  receiving a plurality of responsive RFQ data transaction requests that are provided in response to the request for quote data transaction request; and
  matching at least one of the plurality of responsive RFQ data transaction requests to the first RFQ data transaction request.

11. The method of claim 10, wherein the first RFQ data transaction request is indicative and the method further comprises configuring the matching workflow engine to start a negotiation process upon determination that the at least one of the plurality of responsive RFQ data transaction requests is determined to match properties of the first RFQ data transaction request.

12. The method of claim 11, wherein the negotiation process includes communication of additional details concerning the match between participants associated with the at least one of the plurality of responsive RFQ data transaction requests and the first RFQ data transaction request.

13. The method of claim 10, wherein the first RFQ data transaction request is firm, wherein the method further comprises configuring the matching workflow engine to start a matching process upon determination that the at least one of the plurality of responsive RFQ data transaction requests is determined to match properties of the first RFQ data transaction request.

14. The method of claim 13, wherein the matching process is started without additional communication from corresponding participants of the at least one of the plurality of responsive RFQ data transaction requests and the first RFQ data transaction request.

15. The method of claim 10, further comprising a blockchain that is stored to non-transitory storage of at least one computing node.

16. The method of claim 15, further comprising storing each event that is handled by the matching workflow engine into a blockchain transaction that is recorded to the blockchain.

17. The method of claim 10, wherein the at least one participant defined data structure that includes at least one participant defined field is based on one of the plurality of standard data structures for which a participant has added the at least one participant defined field.

18. The method of claim 10, configuring the matching workflow engine to operate differently depending on what configuration options are specified in the reference database.

* * * * *